United States Patent
Toukura

[11] Patent Number: 5,597,371
[45] Date of Patent: Jan. 28, 1997

[54] ENGINE TORQUE CONTROLLER

[75] Inventor: Nobusuke Toukura, Yokohama, Japan

[73] Assignee: Nissan Motor Co., Ltd., Yokohama, Japan

[21] Appl. No.: 501,568

[22] Filed: Jul. 12, 1995

[30] Foreign Application Priority Data

Jul. 22, 1994 [JP] Japan ................................. 6-171102
Dec. 20, 1994 [JP] Japan ................................. 6-316718

[51] Int. Cl.$^6$ ................................................ B60K 41/04
[52] U.S. Cl. ........................ 477/111; 123/481; 123/492
[58] Field of Search ......................... 477/111; 123/325, 123/481, 492

[56] References Cited

U.S. PATENT DOCUMENTS

| | | | |
|---|---|---|---|
| 4,274,382 | 6/1981 | Sugasawa et al. | 123/481 |
| 4,502,448 | 3/1985 | Otobe | 123/492 |
| 4,909,224 | 3/1990 | Nishiyama et al. | 123/492 |
| 5,065,716 | 11/1991 | Nakagawa et al. | 123/492 |
| 5,119,781 | 6/1992 | Trombley et al. | 123/325 |
| 5,319,558 | 6/1994 | Nemoto et al. | 123/419 |
| 5,437,253 | 8/1995 | Huffmaster et al. | 123/481 |

*Primary Examiner*—Dirk Wright
*Attorney, Agent, or Firm*—Foley & Lardner

[57] ABSTRACT

A timing is detected according to which a vehicle accelerates from a fuel cut state, and a cylinder is detected in which combustion takes place immediately after this timing. A cylinder corresponding to a predetermined combustion order from the detected cylinder is then specified. By reducing the torque produced in the specified cylinder, forward/backward vibration of the vehicle due to variation of engine output torque during acceleration from coasting is suppressed.

9 Claims, 8 Drawing Sheets

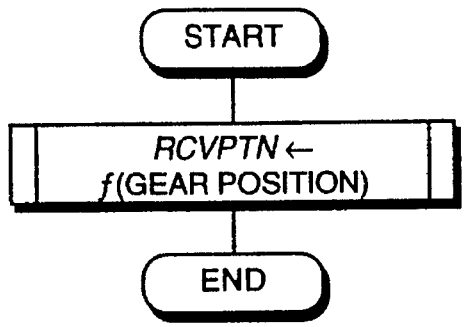
FIG.8A
| GEAR POSITION | RCVPTN |
|---|---|
| 2 | 111111001111 |
| 3 | 111110111111 |
| 4 | 110011111111 |
1 = ON  0 = OFF
FIG.8B
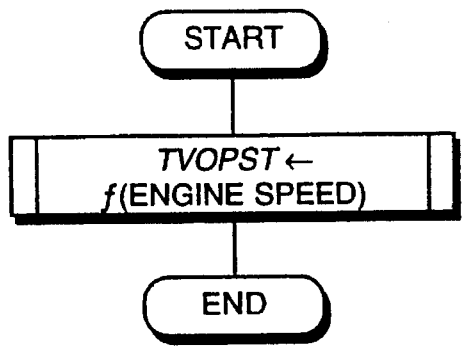
FIG.9A
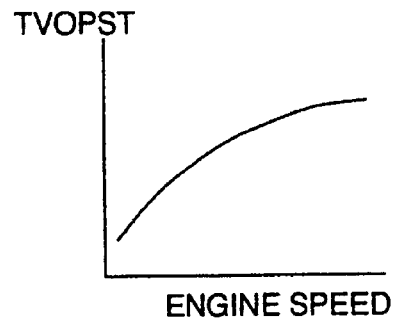
FIG.9B
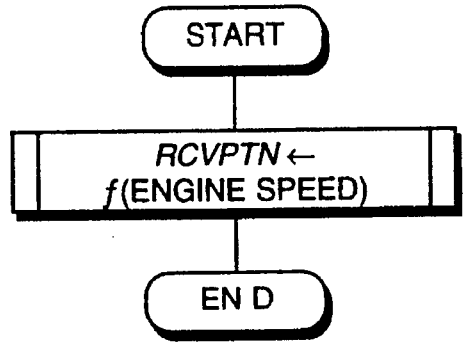
FIG.10A
| ENGINE SPEED(rpm) | RCVPTN |
|---|---|
| 0 ~ 800 | 111111111111 |
| 800 ~ 1600 | 110111111111 |
| 1600 ~ 2400 | 110011111111 |
| 2400 ~ 3200 | 111101111111 |
| 3200 ~ 4000 | 111110011111 |
| 4000 ~ 4800 | 111111011111 |
| 4800 ~ 5600 | 111111101111 |
| 5600 ~ 6400 | 111111100111 |
1 = ON  0 = OFF
FIG.10B

ENGINE TORQUE CONTROLLER

FIELD OF THE INVENTION

This invention relates to a torque controller to prevent forward/backward vibration of a vehicle body when the vehicle accelerates from coasting.

BACKGROUND OF THE INVENTION

When the accelerator of a vehicle is depressed to accelerate the vehicle from coasting, i.e. when the vehicle is running after the fuel supply to the engine has stopped, the output torque of the engine changes in steps so that torque shock occurs. In vehicles provided with manual transmission or automatic transmission directly connected to the clutch when the vehicle is coasting, this torque shock may cause the drive shaft or drive system to suffer a twisting oscillation via the clutch. This twisting oscillation causes a forward/backward vibration of the vehicle which makes the driver or passengers uncomfortable.

In order to prevent this forward/backward vibration, Tokkai Sho 60-81446 published by the Japanese Patent Office in 1985 discloses a fuel supply controller having a function for stopping fuel supply to specific cylinders at predetermined intervals when an engine provided with a fuel injector for each cylinder is accelerated from coasting.

For example, by supplying fuel alternately to every other cylinder in this way, the rise of engine output torque is smoothed, and torque shock is reduced.

According to this device, torque shock is reduced, but the reaction of the vehicle to the depression of the accelerator becomes sluggish so that acceleration performance is impaired.

Further, although the cylinders to which fuel supply is stopped are predetermined, the cylinder of which the spark plug is ignited first, is different each time combustion restarts. It is thus a matter of chance whether or not fuel is supplied to the cylinder which ignites first when combustion restarts. However, the stopping of fuel supply for suppressing vibration is only effective for 5-6 times in terms of supply, or 2-3 times in terms of fuel supply cuts, after the restart of combustion. The combustion pattern therefore largely varied depending on whether or not fuel was supplied to the cylinder which ignited first when combustion was restarted, and there was a large scatter in suppression of torque shock.

SUMMARY OF THE INVENTION

It is therefore an object of this invention to suppress forward/backward vibration of a vehicle when an accelerator is depressed after fuel supply is stopped, without adversely affecting acceleration performance.

It is a further object of this invention to achieve this suppression of vibration stably without relying on chance.

In order to achieve the above objects, this invention provides a torque controller for use with such a vehicle engine that has a plurality of cylinders, an accelerator for supplying a fuel amount according to an operation amount of the accelerator to each of the cylinders in a predetermined sequence, a mechanism for respectively igniting the fuel supplied to the cylinders, and a mechanism for interrupting the supply of fuel to the cylinders when the operation amount is zero under predetermined conditions. The controller comprises a mechanism for determining a timing according to which the vehicle accelerates from a state where fuel supply to the cylinders is cut off, a mechanism for detecting a cylinder in which combustion is performed immediately after this timing, a mechanism for specifying, from the detected cylinder and the sequence, a cylinder at a predetermined combustion order from the detected cylinder, and a mechanism for reducing the torque generated by the specified cylinder.

It is preferable that the timing determining mechanism comprises a mechanism for detecting if the accelerator is operated and a mechanism for detecting if the fuel supply is cut off, and the timing determining mechanism then determines the timing when the fuel supply is cut off while the accelerator is being operated.

According to another aspect of this invention, the timing determining mechanism comprises a mechanism for detecting if the operation of the accelerator has commenced, a mechanism for detecting an elapsed time after the operation has commenced and a mechanism for detecting an accelerator operation amount. The timing determining mechanism then determines the timing when the accelerator operation amount exceeds a predetermined value within a predetermined time after the accelerator operation has commenced.

In this case, it is preferable that the controller further comprises a mechanism for detecting an engine speed and a mechanism for setting the predetermined value to be lager the higher the engine speed.

The torque reducing mechanism preferably comprises a mechanism for stopping fuel supply to the specified cylinder. It is also possible that the torque reducing mechanism comprises a mechanism for stopping igniting the fuel in the specified cylinder.

The specifying mechanism may specify a plurality of cylinders.

If the engine further comprises a transmission that varies a gear ratio between a low gear ratio and a high gear ratio, it is preferable that the controller further comprises a mechanism for detecting the gear ratio and a mechanism for setting the predetermined combustion order to be later with the low gear ratio than with the high gear ratio.

It is also preferable that the controller further comprises a mechanism for detecting engine speed and a mechanism for setting the predetermined combustion order be later the higher the engine speed.

The details as well as other features and advantages of this invention are set forth in the remainder of the specification and are shown in the accompanying drawings.

BRIEF DESCRIPTION OF THE DRAWINGS

FIG. 8 is a combination of a flowchart and a map describing a fuel injection pattern determining process according to the third embodiment.

FIG. 9 is a combination of a flowchart and a map describing the process of determining a predetermined value TVOPST of a throttle opening according to the third embodiment.

FIG. 10 is similar to FIG. 9, but showing a fourth embodiment of this invention.

DESCRIPTION OF THE PREFERRED EMBODIMENTS

Figure 1:
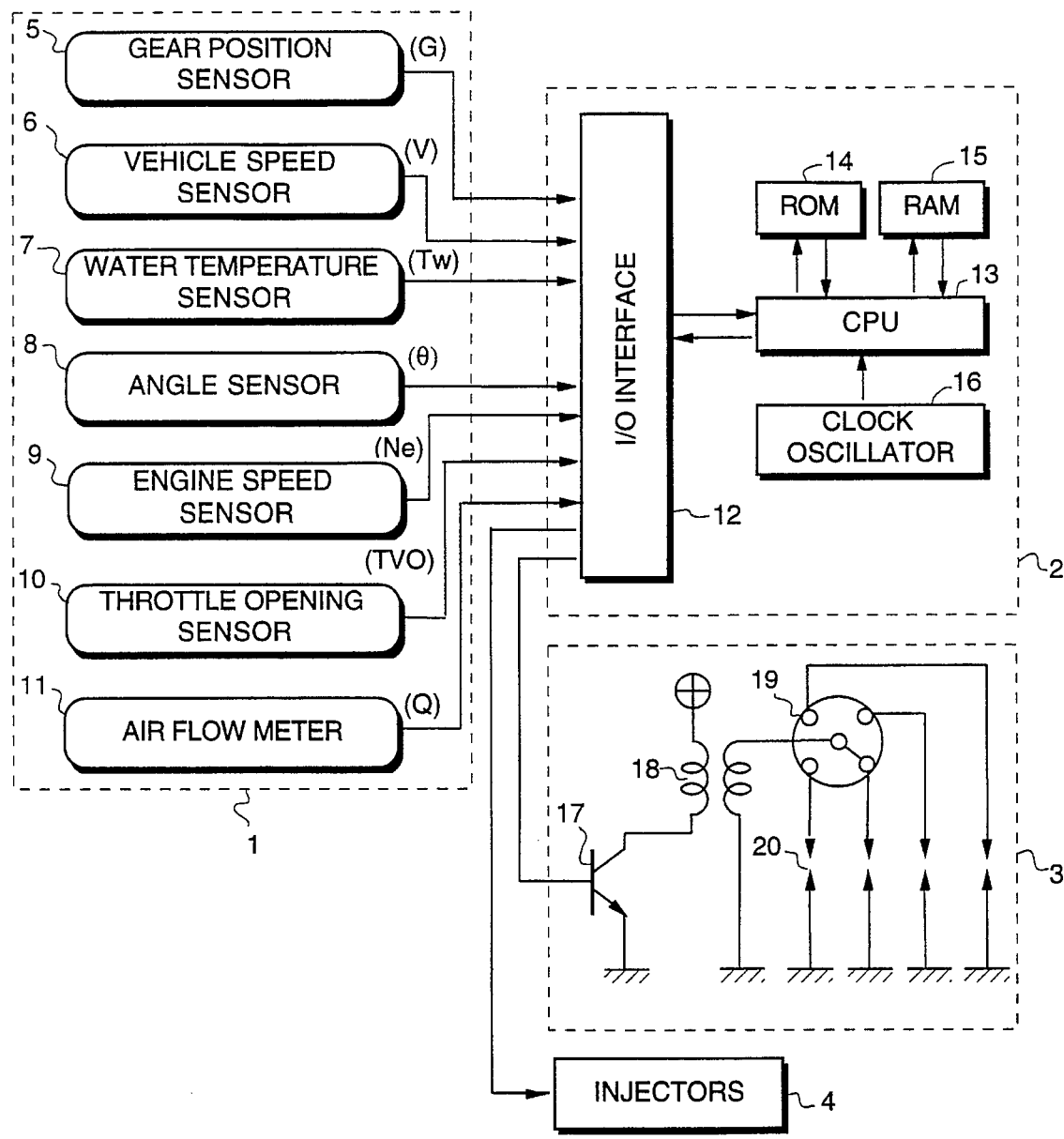
FIG. 1 is a schematic diagram of a fuel supply controller according to this invention.

Referring to FIG. 1 of the drawings, an engine is provided with six cylinders that perform combustion at a predetermined angular interval, and fuel injection is performed in each cylinder by injectors 4. A spark plug 20 is provided in each cylinder, these plugs 20 being energized at a predetermined angular interval by an ignition device 3 comprising a transistor 17, ignition coil 18 and distributor 19.

This fuel injection and ignition are controlled by a control unit 2.

The control unit 2, which may for example be a microprocessor, comprises an I/O interface 12 that handles signal input from sensors detecting engine running conditions, and signal output to injectors 4 and the ignition device 3, a CPU 13 for performing calculations, a ROM 14 for storing initial values, a RAM 15 for temporary storage of data required for control, and a clock oscillator 16 for generating a time reference for control.

Sensors that detect engine running conditions comprise a gear position sensor 5 interposed between the engine and drive shaft for detecting a gear position G of the gears, a vehicle speed sensor 6 for detecting vehicle speed, a water temperature sensor 7 for detecting engine cooling water temperature Tw, an angle sensor 7 for continuously detecting a rotation angle θ of the engine, an engine speed sensor 9 for detecting an engine speed Ne, a throttle opening sensor 10 for detecting an opening TVO of a throttle for increasing and decreasing the intake air volume, and an air flow meter 11 for detecting an engine air intake volume Q. The throttle opening TVO varies depending on the operation amount of the accelerator in the passenger compartment of the vehicle.

The control unit 2 calculates a basic injection mount of each injector 4 based on the engine speed Ne and air intake volume Q. Various corrections are applied to this basic fuel injection amount depending on engine running conditions, and output to the injectors 4 as a fuel injection pulse signal at a predetermined timing. The injector 4 is opened and closed according to this injection signal, and injects, fuel into the intake air at a predetermined angle of the engine rotation. Fuel injection from the injector 4 is cut when the vehicle is coasting, i.e., the engine speed is equal to or greater than a predetermined value and the throttle opening TVO is zero. Such a fuel injection control is disclosed in the aforesaid prior art.

The control functions of the control unit 2 according to this invention are executed only when predetermined conditions are satisfied in the aforesaid fuel injection control process (referred to hereinafter as basic control). The control functions according to this invention will now be described.

When the aforesaid fuel injection cut function is released and fuel injection is resumed, the control unit 2 smooths the rise of engine torque by selecting cylinders for fuel injection and cut according to a predetermined pattern stored in ROM 14 of the control unit 2. In this pattern, the cylinders at specific combustion orders from the cylinder with which the fuel injection is resumed are defined for fuel cut. Upon restart of the fuel injection, the control unit first identifies the first fuel injection cylinder, and then determines the cylinders for fuel cut based on the identified cylinder and the stored pattern.

The process of this torque control will now be described with reference to the flowcharts of FIG. 2 and FIG. 3.

Figure 2:
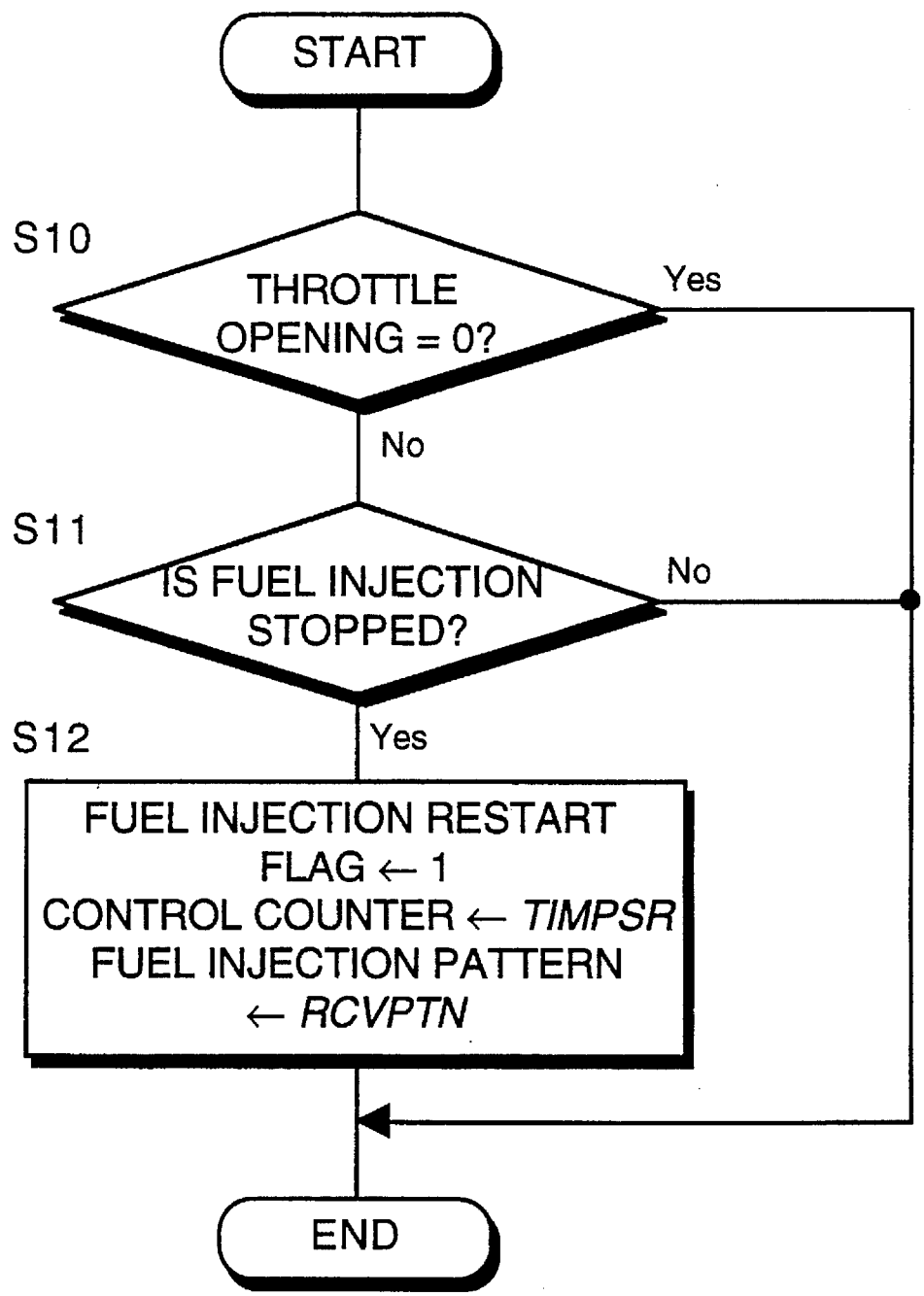
FIG. 2 is a flowchart showing a fuel injection restart timing determining process according to this invention.

FIG. 2 shows a routine for determining the timing according to which the vehicle shifts from coasting to acceleration. More specifically, this timing is determined when the accelerator is depressed while the engine fuel supply is stopped. This routine is repeated at intervals of, for example 10 ms, regardless of the engine running conditions.

First, in a step S10, it is determined whether or not the throttle opening TVO is 0. When the throttle opening is 0, the accelerator is not depressed, so it is determined that the aforesaid timing does not hold and the routine is terminated.

When the throttle opening TVO is not 0, it is determined in a step S11 whether or not fuel is being supplied. This determination is for example based on a fuel supply signal output by the injector 4 from the control unit 2.

If fuel is already being supplied, the timing does not correspond to the change from fuel cut to acceleration which should be detected by this routine, so the routine is terminated.

It is desired to detect the state when accelerator is depressed, but fuel has not yet been injected. When these conditions hold, in a step S12, a fuel injection restart flag that indicates the timing when fuel injection resumes, is set to 1, a control counter is set to an initial value TIMPSR, a fuel injection pattern is set to a predetermined pattern RCVPTN, and the routine is terminated.

The control counter measures an elapsed time starting from when fuel injection resumes. It is decremented at fixed intervals, and when its value reaches zero, the control period has terminated. The fuel injection pattern determines the cylinders into which fuel should be injected after fuel injection has resumed and the cylinders in which fuel injection should stop. According to the predetermined pattern RCVPTN to which the fuel injection pattern is set, it is determined that fuel injection should stop in, e.g. the third and eighth cylinders, counting from the cylinder in which combustion first resumed as shown in FIG. 4.

An initial setting TIMPSR of the control counter and the injection pattern RCVPTN are previously stored in the ROM 14, and in the step S12, the CPU 13 reads these values from the ROM 14 and stores them in the RAM 15.

Figure 3:
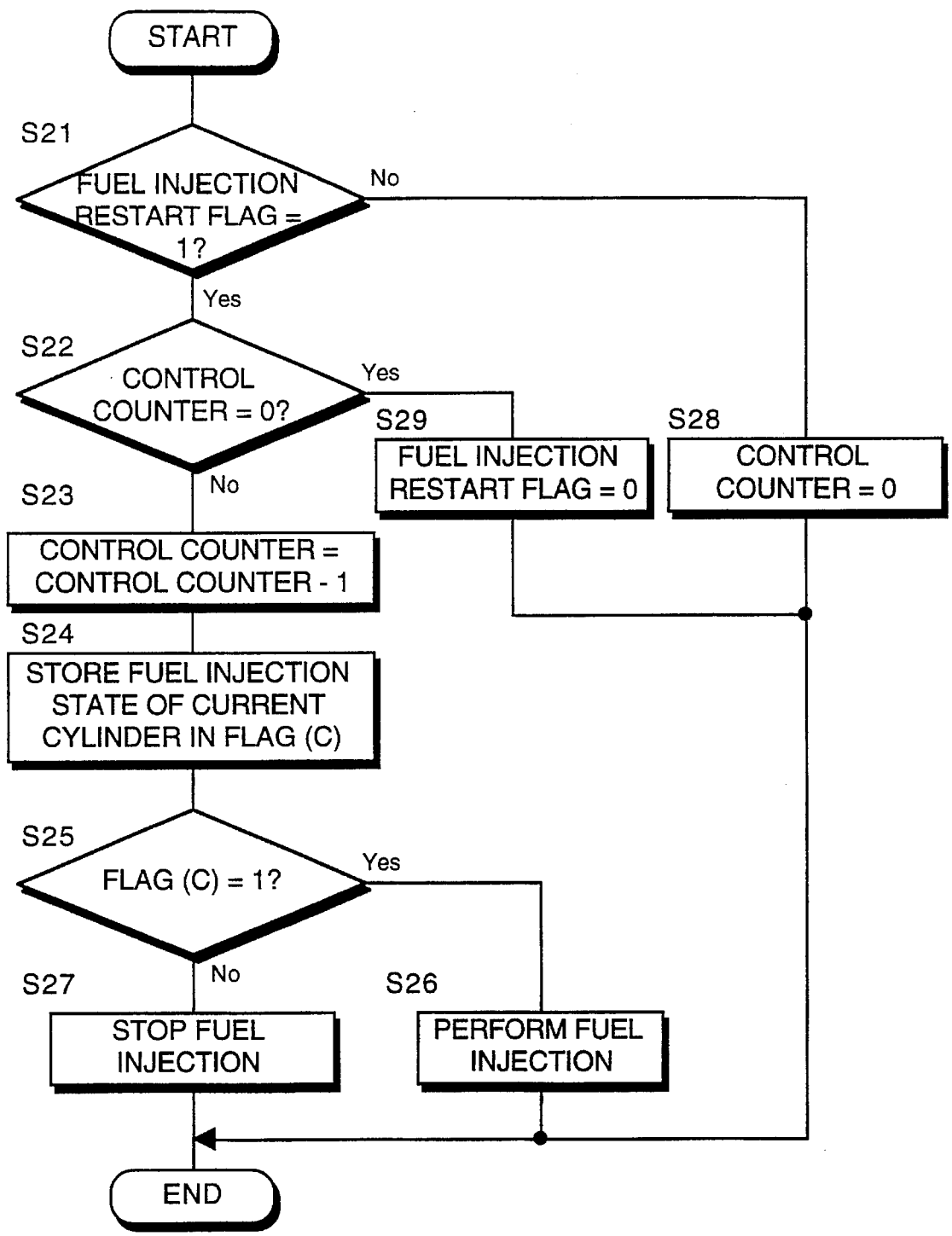
FIG. 3 is a flowchart showing a fuel injection control process according to this invention.

FIG. 3 shows a routine for controlling torque when fuel supply is resumed. Unlike the routine of FIG. 2, this routine is executed when fuel is injected into each cylinder, i.e. at a predetermined rotation angle of the engine.

Here, it is first determined in a step S21 whether or not the fuel injection restart flag is 1. When this flag is not 1, It is determined that the aforesaid torque control conditions are not satisfied, and the control counter is cleared in a step S28.

When the fuel injection restart flag is 1, it is determined in a step S22 whether or not the control counter is 0. When the control counter is 0, the torque control period has terminated, so torque control is not performed and the fuel injection restart flag is cleared in a step S29.

When the fuel injection restart flag is 0 or the control counter is 0 as described hereintofore, the torque control of this invention is not performed, and the control unit 2 performs the aforesaid basic control wherein fuel is either injected or fuel injection is stopped according to the running conditions. This control is not shown in the flowchart.

When the control counter is not 0 in step S22, torque control is being performed. In this case, the control counter is decremented in the step S23, and a value showing whether the cylinder into which fuel is to be injected in this control cycle corresponds to the aforesaid third or eighth cylinder, is stored in a flag (C) in a step S24. This is done by comparing the aforesaid fuel injection pattern and the value of the control counter. For a cylinder in which fuel injection is to be stopped, 0 is stored in the flag (C), otherwise 1 is stored in the flag (C).

In a step S25, it is determined whether or not the flag (C) is 1. When it is 1, fuel injection is performed in the cylinder in question in a step S26, and when it is 0, fuel injection is stopped in a step S27.

Figure 4A:
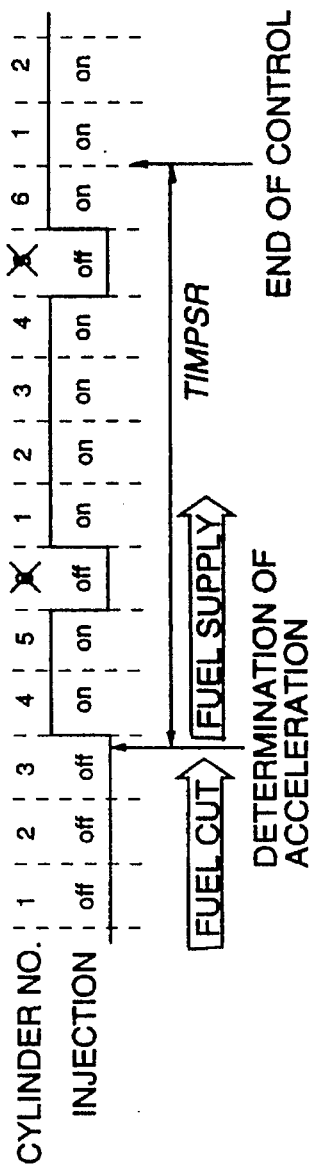
FIG. 4 is a fuel injection pattern and timing chart showing torque variation according to this invention.
Figure 4B:
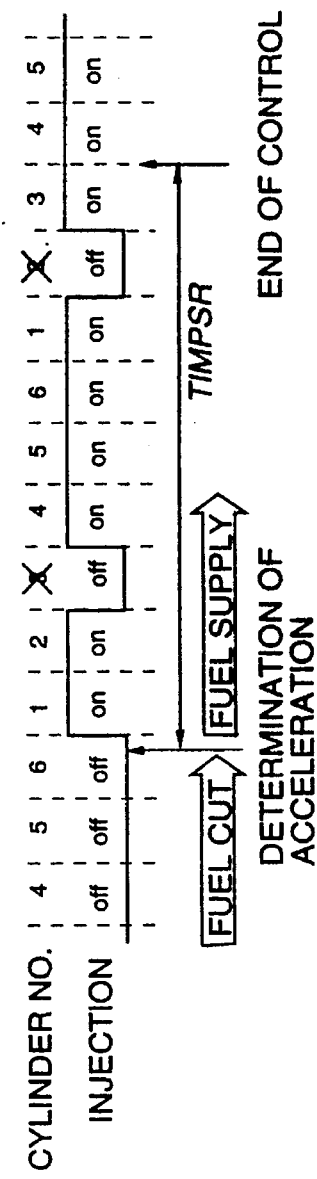

FIG. 4 shows the fuel injection pattern of the cylinders according to the aforesaid torque control. The cylinder in which combustion is first performed when combustion resumes after a fuel cut is No. 4 in FIG. 4(A), and No. 1 in FIG. 4(B). Hence, the cylinder in which combustion is first performed when combustion resumes is not fixed, however as a result of comparing the value of the decremental control counter and the set fuel injection pattern as described hereinabove, fuel injection will always stop in the cylinder situated a predetermined number of cylinders away when combustion resumes.

Figure 4C:
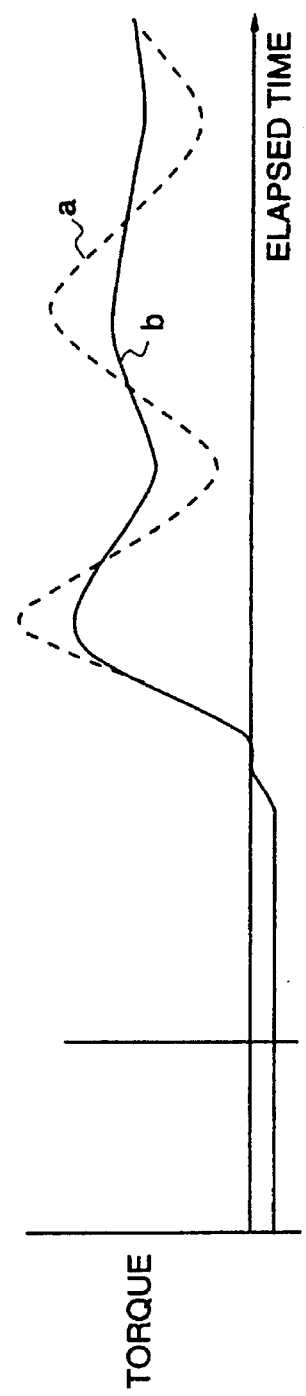

When the vehicle accelerates from coasting, the torque transmitted to the drive shaft causes vibration as shown by the line (a) in FIG. 4(C). The amplitude of this vibration becomes a maximum approximately 150 ms after fuel injection resumes, and then gradually decreases. To control this vibration, the preceding combustion must be controlled, however if the engine speed at this stage in a six cylinder engine is 1200 rpm, there are only 5–6 injections before the maximum vibration occurs. According to this embodiment, fuel cut is performed in the third and eighth cylinders away from the cylinder in which combustion resumes, whichever this latter cylinder may be, as shown in FIG. 4(A) and 4(B). In other words, fuel injection is stopped with the optimum timing for vibration control, so vibration is always suppressed as shown by the solid line of FIG. 4(C).

Figure 5:
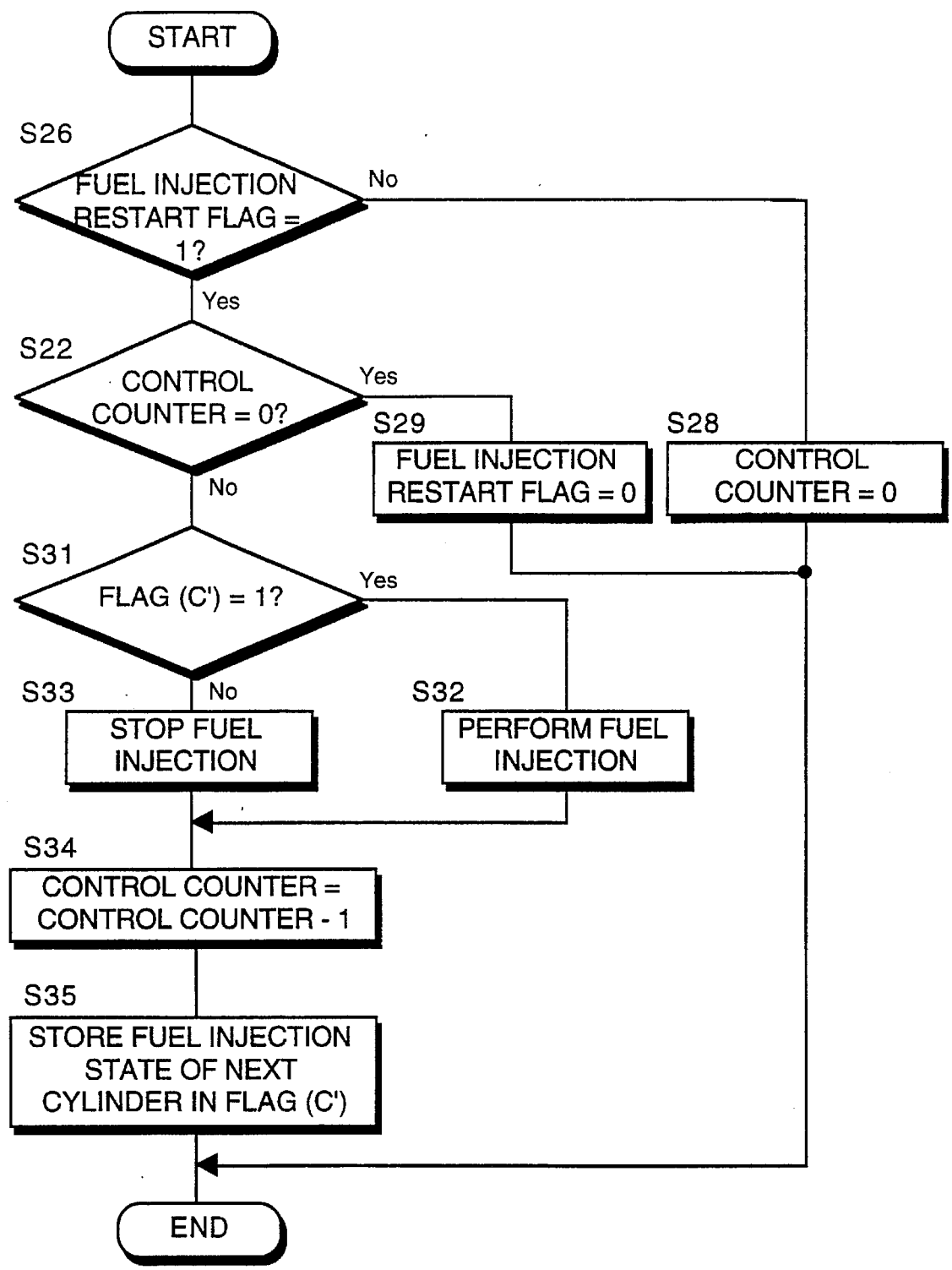
FIG. 5 is similar to FIG. 3, but showing a second embodiment of this invention.

FIG. 5 shows a second embodiment of this invention wherein the steps S23–S27 have been changed to the steps S31–S35 in the routine of FIG. 3.

According to the second embodiment, instead of the flag (C) showing whether or not the cylinder into which fuel is to be injected in the current control cycle is a fuel cut cylinder, a flag (C') is set showing whether or not the cylinder for injection scheduled in the next control cycle is a fuel cut cylinder.

In the step S23, when the fuel injection start counter is not 0, it is determined in a step S31 whether or not the flag (C') is 1. If it is 1, injection is performed in a step S32, and if it is not 1, injection is stopped in a step S33. In both cases, the control counter is decremented in a step S34, and in a step S35, a value showing whether or not the cylinder scheduled for injection in the next control cycle is a fuel cut cylinder is stored in the flag (C'). This is done by comparing a fuel injection pattern with the value of the control counter as in the step S25, a value of 0 being entered in the flag (C') for a cylinder in which fuel injection will stop, and a value of 1 being entered in the flag (C') otherwise. According to this routine, comparison of the fuel injection pattern and the value of the control counter is not performed at the first injection opportunity after fuel injection has resumed. By setting the initial value of the flag (C') to 1, however, injection will definitely be performed at the first injection opportunity.

FIGS. 6–9 show a third embodiment of this invention.

According to the aforesaid first and second embodiments, when fuel supply is restarted from the fuel cut state, fuel supply was always cut off to a predetermined cylinder, but according to the third embodiment, fuel supply is not cut if the acceleration is gradual. Also, the predetermined pattern RCVPTN is not fixed, but is varied according to the vehicle running conditions.

Figure 6:
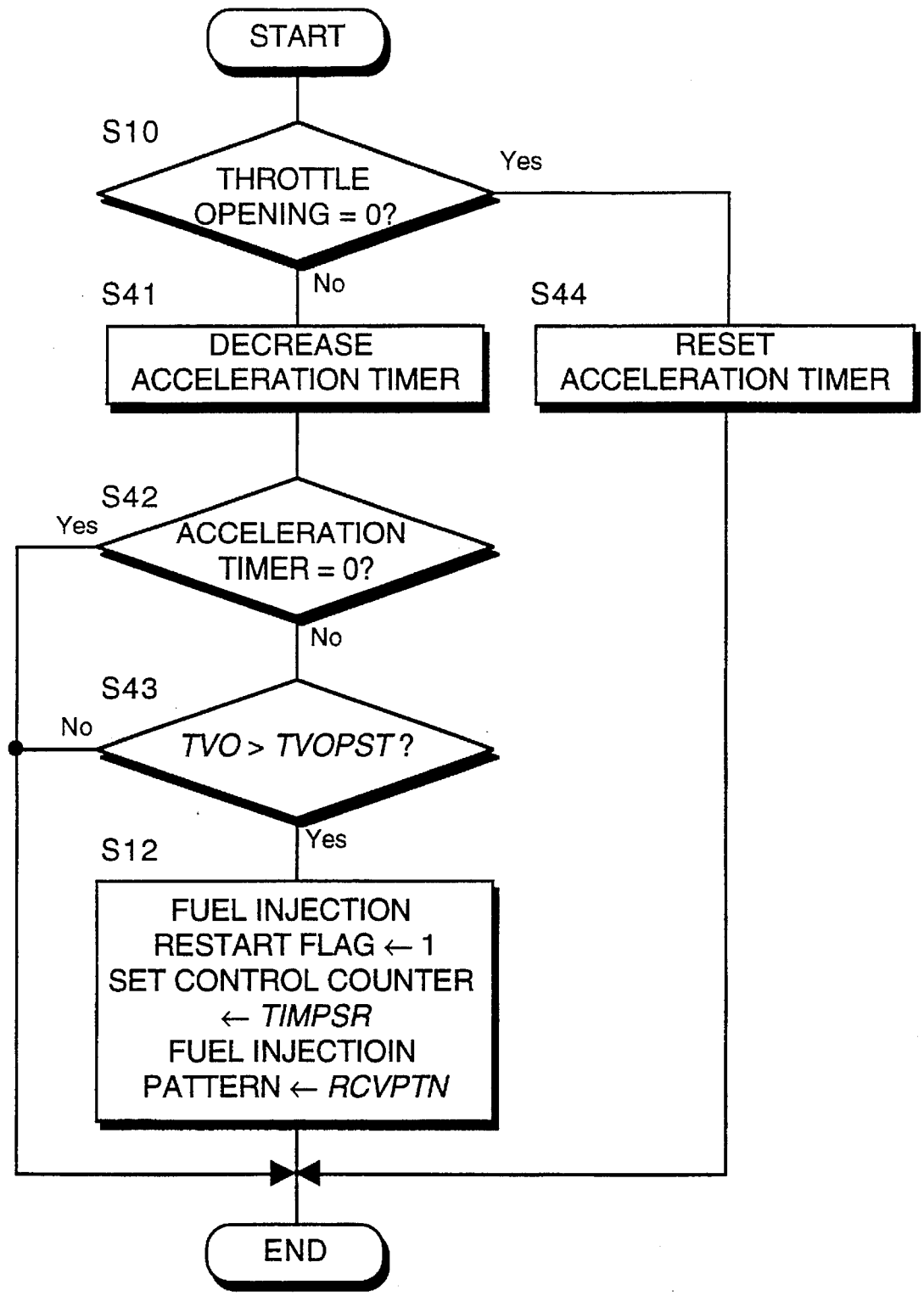
FIG. 6 is a flowchart showing a fuel injection determining process according to a third embodiment of this invention.

The flowchart of FIG. 6 corresponds to the flowchart of FIG. 2 according to the first and second embodiments, and it is also repeated at intervals of, for example 10 ms.

First, in the step S10, when the throttle opening is 0 the accelerator is not depressed, it is not the timing fro the control, and the acceleration timer is reset in a step S44. This acceleration timer is a decremental timer that measures the elapsed time from when fuel injection resumes, and it is set to an initial value when it is reset.

When the throttle opening is 0 in the step S10, the acceleration timer is first decremented in a step S41, and it is determined whether or not the acceleration timer has reached 0, i.e. whether or not a predetermined time has elapsed from when fuel injection is recommenced, in a step S42. If the predetermined time has elapsed, the routine is terminated.

If the value of the acceleration timer is not 0, the throttle opening TVO is compared with a predetermined value TVOPST in a step S43. When TVO does not exceed TVOPST, the routine is terminated. The predetermined value TVOPST is set to a throttle opening or an accelerator depression amount which generates torque shock when fuel supply is resumed.

When TVO exceeds TVOPST, a fuel injection restart flag is set to 1 in the step S12, the control counter is set to the initial set value TIMPSR, and the fuel injection pattern is set to the predetermined pattern RCVPTN.

The pattern RCVPTN is determined by the process shown in FIG. 8. In this embodiment, a map of different fuel injection settings according to gear position as shown in FIG. 8(B) is stored in the ROM 14 of the control unit 2, RCVPTN is selected based on a gear position signal G of the gear position sensor 5, and set to the fuel injection pattern as shown in the flowchart of FIG. 8(A).

In this map, 1 means that fuel injection is to be performed, and 0 means that fuel injection is to be stopped. The larger the gear ratio, i.e. the lower speed gears are used, the timing of stopping fuel injection is shifted to the later.

This is because with a larger gear ratio, the effect of change of engine output torque on the vibration of the vehicle is smaller, and the effect appears later.

Using the aforedetermined control parameters, fuel supply to a specific cylinder is stopped according to the flowcharts of FIG. 3 or FIG. 5.

Figure 7A:
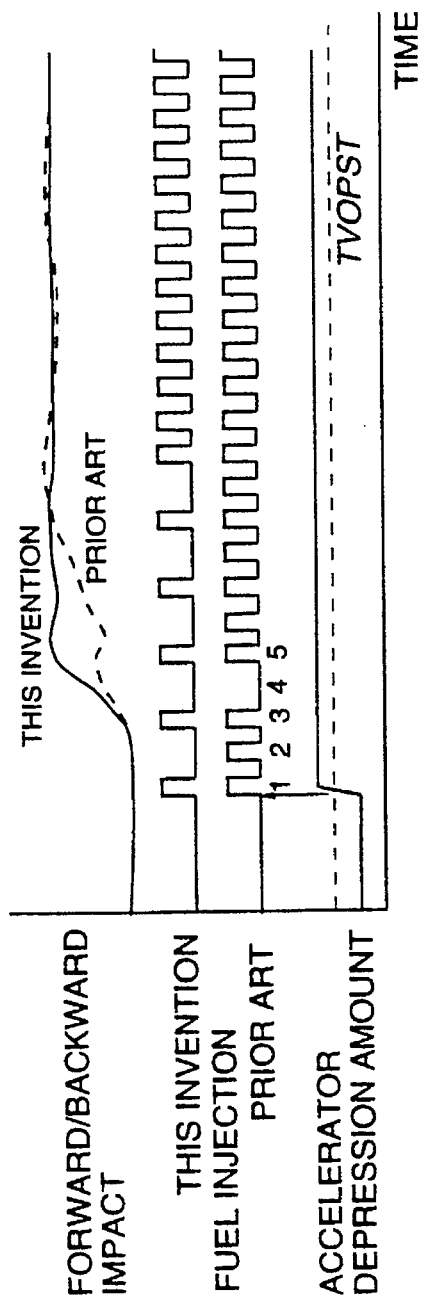
FIG. 7 is a fuel injection pattern and a timing chart showing vehicle vibration according to the third embodiment.
Figure 7B:
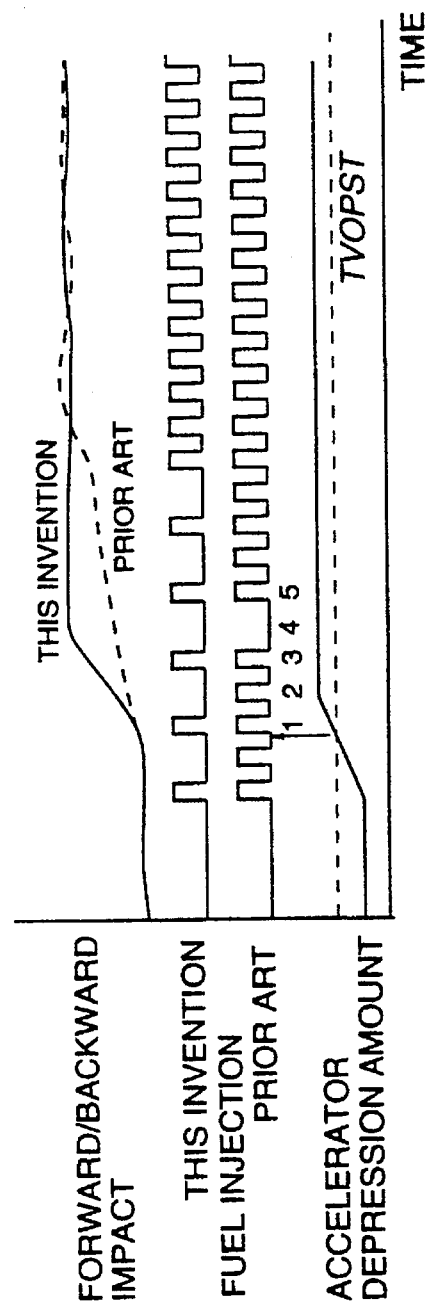

According to this embodiment, torque control begins when the accelerator depression amount exceeds the set value TVOPST, as shown in FIG. 7. In FIG. 7(A), the accelerator depression speed is fast so that the depression amount soon exceeds the set value TVOPST. In FIG. 7(B), however, the accelerator depression speed is slow so that torque control begins some time after fuel supply has resumed, and the basic fuel injection control is performed until then. Torque control variations can therefore be suppressed without losing too much acceleration performance whether the vehicle is accelerated slowly or rapidly The determination as to whether or not to perform torque control when fuel supply is resumed is made during the set time of the acceleration timer. When this time is exceeded, torque control is not performed and the basic fuel injection control is performed even if the accelerator depression amount subsequently exceeds the set value.

Further, when the accelerator depression mount is small, the torque shock is very small. Hence, by performing torque control only when the accelerator depression amount exceeds the predetermined value within the predetermined time after resuming fuel injection, good acceleration performance is obtained while the variation of engine output torque is suppressed to a minimum when fuel supply is resumed.

The vibration of the vehicle due to variation of engine output torque as a result of accelerator depression, is less for higher engine speeds. The conditions under which torque reduction control is performed may therefore be set more finely, and vibration suppressed more effectively, by varying the predetermined value TVOPST according to the engine speed No, as shown for example in FIG. 9.

Instead of setting the fuel injection pattern RCVPTN according to the gear position, it can also be set according to the engine speed No as shown by FIG. 10. In this case, the higher the engine speed, he timing of stopping fuel injection is shifted to the later. This is because when the engine speed is lower, the effect of change of the engine output torque is greater and appears earlier.

According to any of the aforesaid embodiments, torque is reduced by stopping fuel injection, but torque may also be reduced by, for example, retarding Ignition of fuel in a specific cylinder. In any case, however, the torque should be reduced in a predetermined combustion order of cylinders when fuel supply is resumed after coasting.

The embodiments of this invention in which an exclusive property or privilege is claimed are defined as follows:

1. A torque controller for use with a vehicle engine, said engine having a plurality of cylinders, an accelerator for supplying a fuel amount according to an operation amount of said accelerator to each of said cylinders in a predetermined sequence, means for respectively igniting the fuel supplied to said cylinders, and means for interrupting the supply of fuel to said cylinders when said operation amount is zero under predetermined conditions, comprising:

means for determining a timing according to which the vehicle accelerates from a state where fuel supply to the cylinders is cut off, means for detecting a cylinder in which combustion is performed immediately after said timing, means for specifying, from said detected cylinder and said sequence, a cylinder at a predetermined combustion order from said detected cylinder, and means for reducing the torque generated by said specified cylinder.

2. A torque controller as defined in claim 1, wherein said timing determining means comprises means for detecting if said accelerator is operated and means for detecting if said fuel supply is cut off, and determines said timing when the fuel supply is cut off while the accelerator is being operated.

3. A torque controller as defined in claim 1, wherein said timing determining means comprises means for detecting if the operation of said accelerator has commenced, means for detecting an elapsed time after said operation has commenced and means for detecting an accelerator operation amount, and said timing determining means determines said timing when said accelerator operation amount exceeds a predetermined value within a predetermined time after said operation has commenced.

4. A torque controller as defined in claim 3, further comprising means for detecting an engine speed and means for setting said predetermined value to be larger the higher the engine speed.

5. A torque controller as defined in claim 1, wherein said torque reducing means comprises means for stopping fuel supply to said specified cylinder.

6. A torque controller as defined in claim 1, wherein said torque reducing means comprises means for stopping igniting the fuel in said specified cylinder.

7. A torque controller as defined in claim 1, wherein said specifying means specifies a plurality of cylinders.

8. A torque controller as defined in claim 1, wherein said engine further comprises a transmission that varies a gear ratio between a low gear ratio and a high gear ratio, and said controller further comprises means for detecting said gear ratio and means for setting said predetermined combustion order to be later with said low gear ratio than with said high gear ratio.

9. A torque controller as defined in claim 1, wherein said controller further comprises means for detecting engine speed and means for setting said predetermined combustion order be later the higher the engine speed.

\* \* \* \* \*